(12) United States Patent
Sibley et al.

(10) Patent No.: US 7,232,533 B2
(45) Date of Patent: Jun. 19, 2007

(54) BICHROMAL ELEMENT SPINNER

(75) Inventors: Frederick L. Sibley, Brooklyn, MI (US); Dale Smith, Ann Arbor, MI (US); Yelena Lipovetskaya, Howell, MI (US); Chris Sciacca, White Lake, MI (US); Lori Schairer, Jackson, MI (US); Martin Lu, Mundelein, IL (US)

(73) Assignee: Xerox Corporation, Stamford, CT (US)

( * ) Notice: Subject to any disclaimer, the term of this patent is extended or adjusted under 35 U.S.C. 154(b) by 280 days.

(21) Appl. No.: 11/125,751

(22) Filed: May 10, 2005

(65) Prior Publication Data

US 2006/0255487 A1 Nov. 16, 2006

(51) Int. Cl.
*B29B 9/10* (2006.01)

(52) U.S. Cl. ............................................... 264/8; 425/8
(58) Field of Classification Search .................. None
See application file for complete search history.

(56) References Cited

U.S. PATENT DOCUMENTS 4,126,854 A  11/1978  Sheridon
5,262,098 A  11/1993  Crowley et al.
6,485,280 B1 *  11/2002  Richley ........................ 425/8
6,540,947 B2 *  4/2003  Martell et al. ................. 264/8

* cited by examiner

*Primary Examiner*—Mary Lynn Theisen
(74) *Attorney, Agent, or Firm*—Pillsbury Winthrop Shaw Pittman, LLP (57) ABSTRACT

The bichromal element spinner apparatus provides the forming of substantially spherical bichromal elements from pigmented molten, but hardenable material compounds which are delivered centrally to a spinning webbed disk through opposite ends of hollow shaft that also spins with the disk. The molten materials are injected into cavities formed between the shaft and the web portions of the disk such that the molten materials are spun outwardly on the opposite surfaces of the disk towards the tip of the disk, where the hardenable materials adhere to each other without mixing, thereby spinning off to bichromal elements. Shrouds attached to the shaft and having no intervening support members over the spinning disk provide quiescent air mass between the disk and the shrouds so as to yield bichromal elements with substantial hemispherical integrity.

20 Claims, 5 Drawing Sheets

BICHROMAL ELEMENT SPINNER

BACKGROUND

All references cited in this specification, and their references, are incorporated by reference herein where appropriate for teachings of additional or alternative details, features and/or technical background.

Disclosed is an apparatus for forming bichromal elements and methods of use of the same in the manufacture of "electric papers".

Bichromal elements and apparatus for making the same are known. However, it is desirable to modify some of the existing apparatus in order to improve the process of making and the product itself, as described later in this disclosure.

Electric papers employing bichromal elements and known as gyricon displays have the attributes of ordinary paper documents. The paper, that is, the display sheet comprises an elastomeric host layer a few mils thick and is heavily loaded with hemispherically bichromal balls, each in the range of 5 to 200 microns in diameter. Each bichromal ball has hemispheres of contrasting colors, such as a white half and a black half, and is contained in its own spherical cavity filled with a dielectric fluid. Upon application of an electrical field, derived from an original image, between electrodes located on opposite surfaces of the host layer, the balls rotate to present one or the other hemisphere to an observer, depending on the polarity of the field, and hence a replica of the over-all corresponding image.

Gyricon sheet material is known in the art. U.S. Pat. No. 4,126,854, titled "Twisting Ball Panel Display", by Sheridon, issued on Nov. 21, 1978, and incorporated by reference herein above describes how to make and use gyricon sheet material containing bichromal spherical elements.

Apparatus and methods for fabricating bichromal elements, or beads are known and varied. In U.S. Pat. No. 5,262,098 Crowley, et al., describe an apparatus for fabricating hemispherically bichromal balls, comprising a separator member having opposing first and second surfaces located and an edge region in contact with both surfaces, and delivery means for flowing first and second colored hardenable fluid material over the first and second surfaces, respectively, so that the fluid materials arrive at the edge at substantially the same flow rate and form a reservoir outboard of the edge region. The reservoir comprises side-by-side regions of different colors which do not intermix. Further means is provided for propelling the first and second fluid materials away from the separator member and out of the reservoir into a fluid medium as a plurality of side-by-side bichromal streams whose forward ends become unstable and break up into droplets which form into spherical balls, each of the balls comprising hemispheres of differently colored hardenable fluid, and means for collecting the bichromal balls.

Figure 1A:
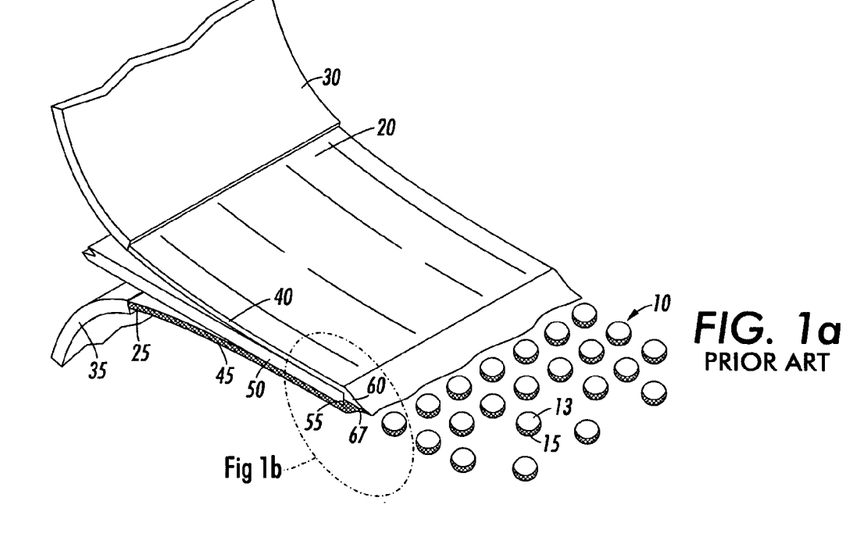
FIG. 1a is a schematic drawing of fluid flow around a separator disk member showing the forming of side-by-side bichromal elements in the form of balls from two differently colored streams of hardenable fluids.
Figure 1B:
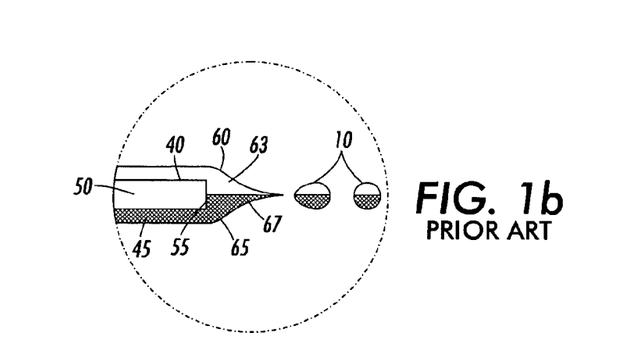
FIG. 1b is an enlarged drawing of the ball forming region of FIG. 1a showing the separation of the balls.

More specifically, FIG. 1a shows an apparatus for making small, pigmented (or dyed) balls 10 that have hemispheres 13 and 15 of two different colors. Two fine planar streams 20 and 25 of a hardenable fluid material are pumped through elongated nozzles 30 and 35 whose ends direct the two fine streams onto opposite planar surfaces 40 and 45 of separator member 50. The fluids flow to the ends of the planar surfaces and over the edge 55 where they form an outboard reservoir 60 of fluid material. By controlling the dispensing rate of each stream relative to the surface distance over which each must flow, it is possible to equalize the flow rate at which each stream reaches the edge, thus enabling the reservoir 60 to include equal amounts of each fluid. It will be noted that the fluids do not intermix, so that the reservoir includes side-by-side portions 63 and 65 thereof, as shown in FIG. 1b. When the rate of flow of the fluids away from the separator edge 55, into the host fluid (air is shown), is great enough, free jets 67 are formed. Each jet comprises a ligament 69 of fluid fed by the reservoir 60 at its originating end and breaking up into side-by-side bichromal balls 10 at its distal end. As the balls continue in their flight, they harden and drop under the influence of gravity, and are finally collected. Usually, the fluids comprise molen carnauba wax and molten polyethylene, both of which flow freely when sufficiently heated and freeze to a hardened form. The black and white pigmented carnauba wax of streams 40 and 45 form black and while hemispheres, as shown in the enlarged view of bichromal ball 10 in FIG. 1a.

Figure 2:
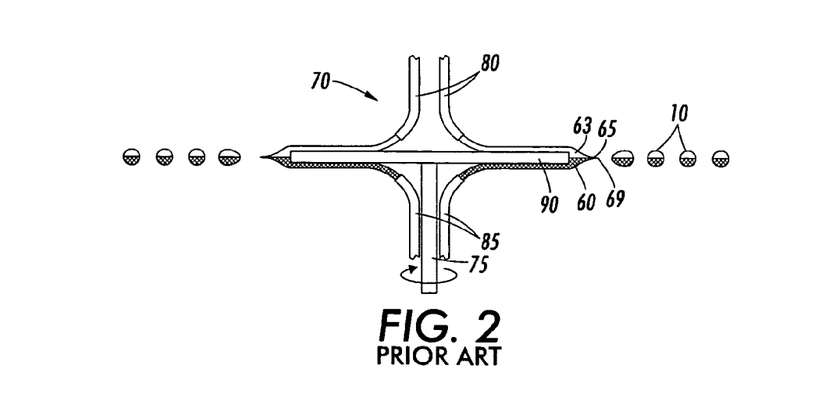
FIG. 2 is a schematic drawing of a spinning disk member showing the separation of streams of hardenable fluids to form bichromal elements.

A spinning disk apparatus 70 for making bichromal balls is shown in FIG. 2. The white pigmented and black pigmented hardenable fluids are introduced, via suitable dispensing nozzles 80 and 85, to the upper and lower surfaces of disc 90 mounted upon a rotatable spindle 75. The fluids are moved to the periphery thereof, on their respective sides, under the influence of centrifugal force. At the edge of the disc they flow together (but not mix) to form a peripheral side-by-side bichromal reservoir 60 from which ligaments 69 extend, whose distal ends dispense balls 10. It is shown in U.S. Pat. No. 5,262,098 that a 3 inch diameter disc about 20 mils thick, rotated at about 2600 to 3000 rpm produces balls about 4 mils in diameter. At too high rotational speeds, the fluids come off their respective surfaces at the square edge without flowing together, resulting in smaller black and white monochrome balls.

Fluid flowing over the edge of the spinning disc 90 tends to form an outboard reservoir 60 in the form of a ring of non-uniform diameter. This ring moves at the same speed as the disc and has circumferential protrusions (see U.S. Pat. No. 5,262,098), known as "Taylor instabilities", caused by the centrifugal force acting against surface tension. As more material is fed into the reservoir, each protrusion starts to peak and release a large droplet of the fluid which is attached to the protrusion by ligament 69. The large drop breaks away followed by smaller droplets. A relatively stable steady state condition then exists, with fluid being fed into the reservoir and into the ligaments, and substantially uniform droplets 10 being ejected into the host fluid from the distal ends of the ligaments 97. The inertial structure of spinning ligaments 97 trailing the disc 90 is held together by surface tension, which also causes their distal ends to be unstable and to break up into droplets 10 as shown in FIG. 2.

In another U.S. Pat. No. 6,485,280, Richley discloses an apparatus for fabricating bichromal elements comprising a separator member having a central rotating point, the separator member having first and second spaced apart, opposed surfaces with an edge region in contact with both of the opposed surfaces. The spacing between the opposed surfaces varies with the distance outwardly from the central rotating point such that the spacing is the largest at the central rotating point and the spacing decreases outwards from the central rotating point and the spacing is a minimum at the edge region. Further each of the opposed surfaces has a substantially annular cup spaced apart from and substantially surrounding the central rotating point. The apparatus for fabricating bichromal elements also includes apparatus for dispensing first and second differently colored hardenable fluids in the cups of the first and second surfaces, respectively, and an apparatus for substantially uniformly spreading the fluid material in the annular cups located in the first and second surfaces and for substantially uniformly spreading the fluid material from the cups over the first and second surfaces toward the edge region to form a reservoir of fluid material outboard of the edge region, and for forming ligaments from the reservoir.

As the shape and size of the bichromal spherical elements in the form of beads or balls are important in the functional performance of electric papers or Gyricon displays, the various parameters that go into making the balls need be controlled properly. One problem is the imperfectly formed hemispherical portions of the balls, usually caused by the flexing and unwanted vibrations of the spinner disk. Another is the premature collision of the balls before they solidify, and also the premature solidification before they assume their spherical shape. These problems and others are addressed by modifying the spinner of the apparatus for making bichromal elements, as further disclosed below.

SUMMARY

Aspects disclosed herein include an apparatus comprising a hollow shaft having a first end, a second end, a mid-section and at least one opening in the mid-section; a separator member centrally attached to the hollow shaft proximal to the mid-section; the separator member having a first surface, a second surface located opposite the first surface, a peripheral region in contact with both the first and second surfaces and a central region, wherein the peripheral region forms a taper from the central region; a webbed portion in the central region of the separator member configured to form at least one annular cavity around the at least one opening in the mid-section of the hollow shaft; a first cover member centrally attached to the hollow shaft proximal to and separated from the first surface of the separator member; a second cover member centrally attached to the hollow shaft proximal to and separated from the second surface of the separator member; and a spindle that is connected to the hollow shaft.

a method comprising providing a bichromal element spinner having a hollow shaft with opposite ends and openings at its mid-section, a tapered double-faced spinner disk centrally attached to the mid-section of the hollow shaft in communication with the openings through one or more annular cavities formed around a centrally formed webbed section on the disk, and one or more shrouds disposed proximal to and separated from the double faces of the spinner disk; introducing first and second, differently colored, hardenable fluid materials through the opposite ends of the hollow shaft; extruding the fluid materials through the openings in the hollow shaft; pooling the fluid materials in the cavities against outside wall of the hollow shaft; flowing the fluid materials from the cavities over the double faces of the tapered disk; forming laminar flow of the fluids over surfaces of the double-faced spinner disk under cover by the shrouds; propelling the first and second fluid materials from the spinning disk to form bichromal streams having side-by-side portions of different colors; causing the forward end of each stream to be unstable and to break up into droplets which form into spherical balls, each of the balls comprising hemispheres of differently colored hardenable fluid; and collecting the bichromal balls.

DETAILED DESCRIPTION

In embodiments there is illustrated:
an apparatus for forming bichromal elements. The apparatus comprises a disk for spinning off fluids to form spherical balls having two hemispherical portions of different colors.

Figure 3A:
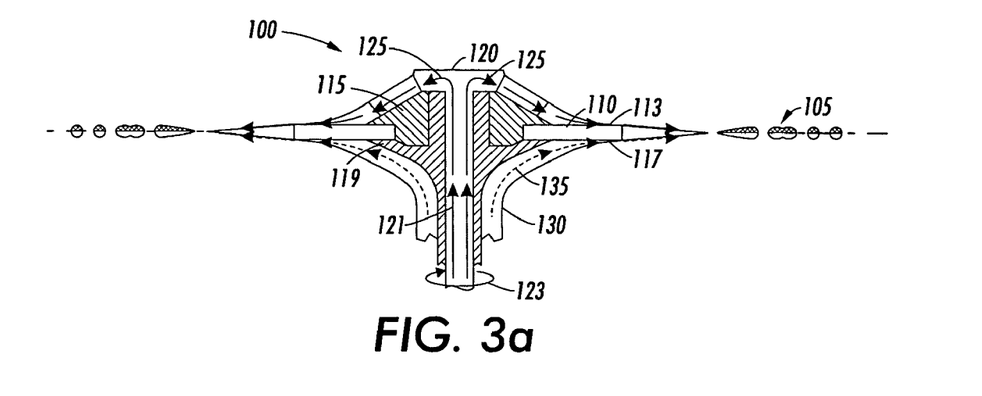
FIG. 3a is a cross-sectional drawing of an embodiment of a spinning disk showing the delivery of two streams of fluids to the opposing surfaces of the disk through slits.

FIG. 3a shows an embodiment of an assembly 100 of a spinner disk 110 and associated fluid supply structure. The stationary fluid supply structure comprises an upper fluid supply member 120 and a lower fluid supply member 130. The spinner disk 110 is disposed between the upper and lower supply members and is configured to rotate therebetween. The upper and lower supply members 120 and 130, respectively, deliver their respective pigmented fluids 125 and 135 to the opposite surfaces 113 and 117 of spinning disk 110 for the process of spinning the fluids to form bichromal elements 105, as described earlier.

In one aspect, spinner disk 110 is an integral part of a hub which is shaped in the form of a tapered ridge 115 on the upper surface 113 of the disk. The raised ridge provides rigidity, and hence eliminates flexing and the attendant vibrations. The integrated hub 115 is press fitted over a hollow shaft having arms 119 that fixedly support the lower surface 117 of disk 110. The hollow shaft is rotatably fitted over supply tube 121 serving the upper fluid supply member 120. Hollow shaft 119 is connected to a spindle 123, which in turn is mountable onto a suitable motor (not shown) for rotating the hollow shaft and the spinner disk 110, as shown in FIG. 3a.

Figure 3B:
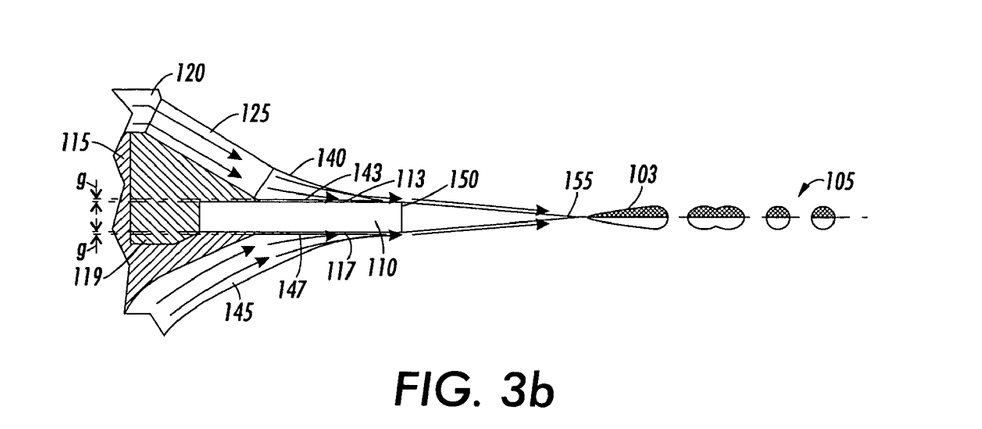
FIG. 3b is an enlarged drawing of a portion of FIG. 3a showing a closer view of the slits delivering two streams of fluids to a spinning disk.

In another aspect, the upper and lower fluid supply members 120 and 130 have outer portions 140 and 145, respectively, which taper outward towards the untapered edge 150 of disk 110, as shown in FIG. 3b. The upper tapered portion 140 and the lower tapered portion 145 form slits 143 and 147 having a gap "g" with respect to the upper and lower surfaces 113 and 117, respectively as shown in FIG. 3b. In still another aspect, the square edge 150 may be tapered to form an apex 155 as shown in the same Figure in order to facilitate a smooth transition to the two layered formation of ligament 103 without mixing. That is, the two layers of fluids adhere to each other to form the ligament without mixing.

In operation, the stationary fluid supply members 120 and 130 meter the pigmented fluids (not limited to black and white) onto the upper and lower surfaces 113 and 117 of disk 110 in a heated, molten state so that they flow freely through slits 143 and 147 to form droplets 105. A heating coil or other heating elements (not shown) may be placed in contact with the stationary supply lines in order to prevent premature freezing of ligaments 103 before they form droplets 105. A pressure head is provided for feeding the fluids through their respective paths 125 and 135 and slits 143 and 147 at a thickness from about 0.25 to about 10 mils onto the entire opposing surfaces 113 and 117 of disk 110 so that they form ligaments 103 and, subsequently, break up into hemispheric bichromal balls without mixing.

Figure 4:
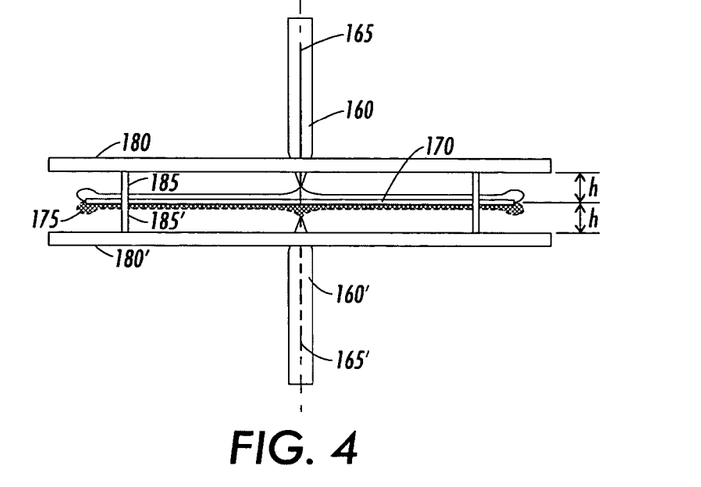
FIG. 4 is a drawing of an aspect of an embodiment showing a pair of shrouds supported by pins over the two surfaces of a spinning disk.

It has been found that in order to run the spinner disk apparatus for longer periods of time without clogging, the fluid may be delivered to the center of the disk directly, thereby eliminating the need for slits altogether. In another embodiment shown schematically in FIG. 4, the two fluids 165 and 165' flow through nozzles 160 and 160' which are located centrally with respect to disk 170. Disk 170 is surrounded by two rotating shrouds 180 and 180' in order prevent one fluid to spiral around the other one due to the rotational swirling winds over the disk in the absence of such shrouds. The swirling winds cause trailing wisps of air in the direction of centrifugal forces which in turn entrain the fluid over the top and bottom surfaces of the disk to cause twisted ligaments 175, thereby giving rise to irregular and twisted bichromal elements (not shown). The rotating shrouds 180 and 180' are mounted onto disk 170 by means of stand-off upper and lower pins 185 and 185', respectively. The shrouds 180 and 180' extend radially outwardly of the disk, which acts as a separator member between the two layers of fluid on opposite surfaces of the disk. The close proximity of the shrouds to the disk causes the air between the shrouds to move as a unit with the spinning disk, presenting relatively quiescent air moving with the free fluid jets 165 and 165' issuing from nozzles 160 and 160'. An exemplary arrangement involves a disk 170 having a diameter from about 1 to about 10 inches, and thickness from about 0.005 to about 0.5 inches, spaced apart from shrouds 180 and 180' by an "h" amount ranging from about 50 to about 250 mils, as shown in FIG. 4. The thickness of the shrouds may vary from about 50 to about 250 mils. The pins also have the additional function of dampening any flexing and fluttering of the disk as the disk rotates.

Figure 5:
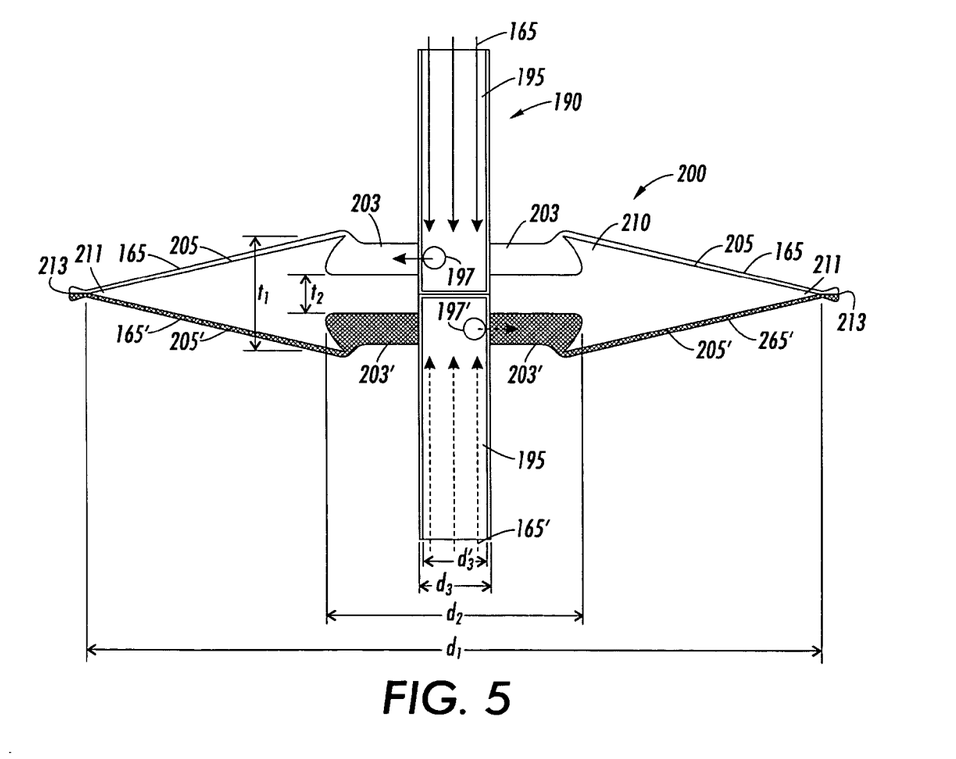
FIG. 5 is a drawing of an embodiment of a bichromal element spinner showing a tapered disk mounted onto a hollow shaft where the hollow shaft delivers fluids centrally to annular cavities formed on a web portion of the tapered disk.

However, it will be appreciated by those skilled in the art that although pins 185 and 185' may help dampen vibrations and hold the shrouds over the spinning disk, they nevertheless disrupt the flow of fluids over the surface of the disk. It is, therefore, desirable to retain the shrouds themselves but without the need for support pins. It is also desirable to be able to deliver the fluids onto the disk without the need for slits 143, 147 of FIG. 3b. FIG. 5 shows an embodiment of a combination of a spinner disk member 200 press fit over a hollow shaft member 190 where the disk member alone has the geometrical stiffness to avoid flutter and unwanted vibrations, and where the hollow shaft member delivers fluid centrally to the disk as explained further below.

In one aspect, the hollow shaft 190 shown in FIG. 5 comprises two chambers: a first chamber 195 configured to receive a first fluid 165 and a second chamber configured to receive a second fluid 165'. The fluid entering chamber 195 is capable of exiting through a first opening 197, while fluid entering chamber 195' is capable of exiting through a second opening 197'. In another aspect, a spinner disk 200 having a centrally formed web is mounted onto shaft 190 to form two annular cavities 203 and 203' surrounding the shaft, as shown in FIG. 5. Fluid exiting opening 197 floods upper cavity 203, which in turn feeds fluid flow to the upper surface 205 of the webbed disk 200. Similarly, fluid exiting opening 197' floods lower annular cavity 203', which in turn feeds fluid flow to the lower surface 205' of the same webbed disk 200.

The webbed disk 200 is of a discus shape comprising, but not limited to, tool steel. The disk has an overall diameter from about 1 to about 10 inches, a thicker body 210 of thickness $t_1$ from about 0.125 to about 0.50 inches towards the center, and a thin tapered tip 211 outwards from the center. The webbed region has a diameter $d_2$ from about 0.25 to about 1.00 inch while the opening in the center of the disk to accommodate the hollow shaft 190 has a diameter $d_3$ from about 0.20 to about 0.75 inches. Shaft 190 comprises, but not limited to, tool steel, machined to a diameter $d'_3$ from about 0.202 to about to about 0.752 inches. The shaft is heat treated to a desired Rc, as is commonly practiced. Disk 200 is then pressed on to the shaft for final machining and balancing. The assembly is finished by applying, but not limited to, electroless nickel plating.

Figure 6A:
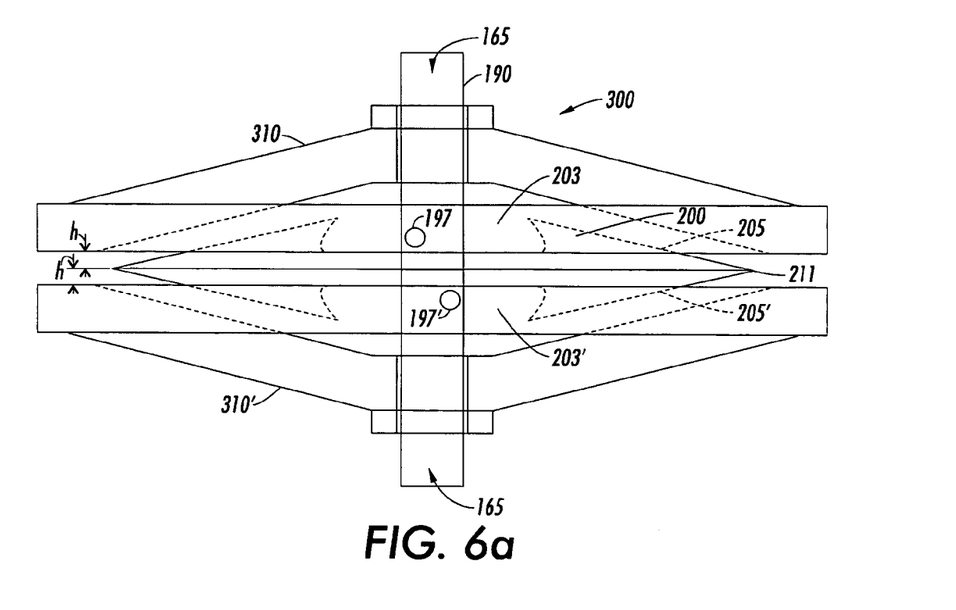
FIG. 6a is a drawing of an aspect of an embodiment shown in FIG. 5 where the tapered disk is disposed between a pair of shrouds which are also mounted onto the rotating hollow shaft.
Figure 6B:
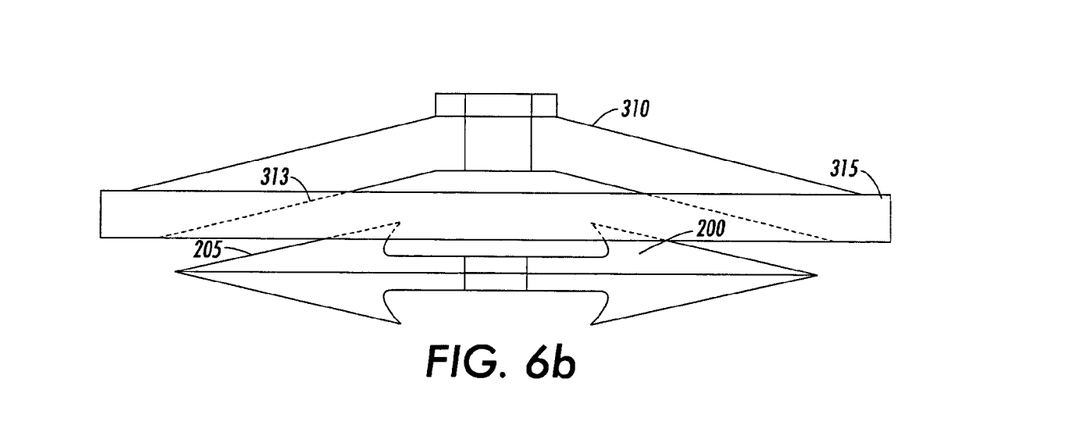
FIG. 6b is an enlarged drawing of a portion of FIG. 6a showing a closer view of the shrouds in relation to the tapered disk having annular cavities.

FIG. 6a shows an embodiment of an assembly 300 of the webbed disk 200 of FIG. 5 mounted onto the hollow shaft 190 and surrounded by a pair of shrouds 310 and 310'. One of the shrouds 310 is shown separately in FIG. 6b. In one aspect, the contour of the inside walls 313 of the shrouds follow the contour of the tapered surface 205 of spinner disk 200 as better seen in FIG. 6b. Both shrouds 310 and have a rim 315 to provide rigidity so that each shroud can maintain a gap "h", shown in FIG. 6a, over disk 200 without the need for supporting pins (See FIG. 4) and in the absence of any vibrations. Gap "h" may have a gap from about 50 to about 375 mils. The shroud may comprise, but not limited to, stainless steel, and ribbed with ridges (not shown) as needed in order to provide the rigidity required. In another aspect, the spinner disk 200 may also be ribbed as needed in order to provide the rigidity for preventing flexing and flutter during rotation.

In operation similar to that which is shown in FIG. 5, and using the same reference numerals for similar parts in FIG. 6a, two streams of a hardenable liquid material 165, 165' are dispensed through liquid feed nozzles (shown partially as openings 197 and 197'), in hollow shaft 190, whose ends direct the hardenable liquid materials 165 and 165' into their respective cup shaped annular cavities 203 and 203', as shown in both FIGS. 5 and 6a. The hardenable liquid material 165, 165' disperses within the cavities 203 and 203' and then begins to flow out of the cavities onto the surfaces 205, 205' of the spinning disk 200 spun by a spindle connected to a motor (not shown). The hardenable liquid material 165, 165' then flows to the ends 211 of the surfaces 205, 205' where they form an outboard reservoir 213 of liquid material, as shown in FIG. 5. By controlling the dispensing rate of each stream into the annular cavities 203 and 203' corresponding to surfaces 205, 205' over which each must flow, it is possible to substantially equalize the flow rate at which the hardenable liquid materials 165, 165' reach the tip region 211, thus enabling the reservoir to include substantially equal amounts of each of the hardenable liquid materials 165, 165'. It will be known to those skilled in the art that, the flow rates can be fine tuned to form bichromal elements with substantially hemispherical halves and hardened (if necessary by introducing cooling of the ligaments described earlier) in flight away from the tip 211 of the spinning disk 200.

Figure 7A:
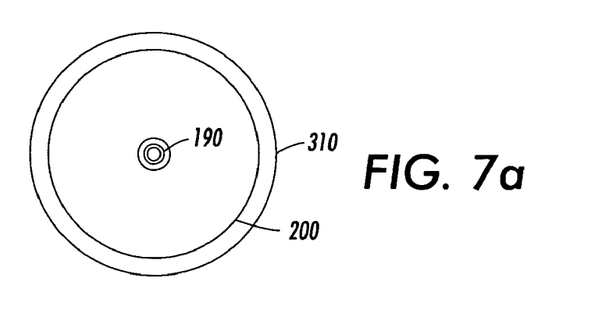
FIGS. 7a-7b are drawings of a product embodiment showing a top-view and a side-view, respectively of a bichromal element spinner.
Figure 7B:
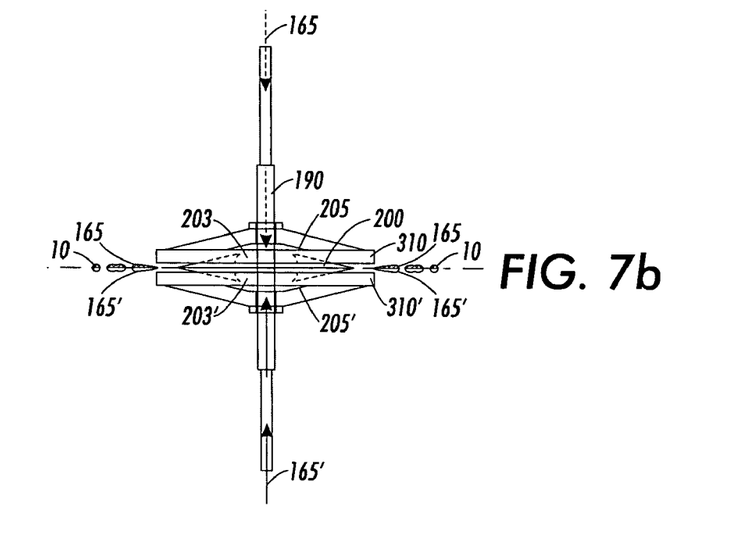
Figure 7C:
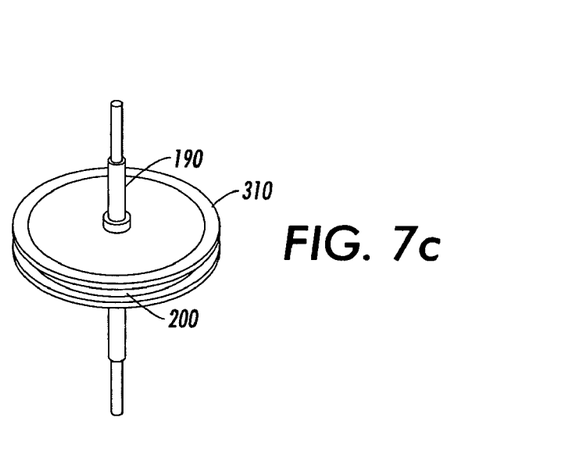
FIG. 7c is an assembly drawing of an embodiment of FIG. 7b showing a perspective view of a bichromal element spinner.

FIGS. 7a-7c show a product assembly of the spinner disk 200, hollow shaft 190 and shroud 310 of the present disclosure. FIGS. 7a and 7b show a top view and a side view, respectively, of the assembly, while FIG. 7c shows a perspective view of the assembly. The apparatus provides the forming of substantially spherical bichromal elements 10 from two pigmented molten, but hardenable material compounds 165 and 165' which are delivered centrally to a spinning webbed disk 200 through opposite ends of hollow shaft 190 that also spins with the disk. The molten materials are injected into cavities 203 and 203' formed between the shaft and the web portions 205 and 205' of the disk such that the molten materials are spun outwardly on the opposite surfaces of the disk towards the tip of the disk, where the hardenable materials 165 and 165' adhere to each other without mixing, thereby spinning off to bichromal balls 10 as shown in FIG. 7b under the influence of the centrifugal forces of the spinning disk. The integrity of each of the hemispherical portions of the bichromal elements is established by providing ribbed shrouds 310 and 310' over and in close proximity of and separated from the surfaces of the disk attached to the shaft 190 without any intervening structures so that the air mass between the shrouds and respective surfaces of the disk move substantially in unison, thereby giving rise to a laminar flow without any turbulence which may otherwise create undulating ligaments resulting in irregular bichromal elements.

While the invention has been particularly shown and described with reference to a particular embodiment(s), it will be appreciated that variations of the above-disclosed embodiments(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. An apparatus comprising
a hollow shaft having a first end, a second end, a mid-section and at least one opening in said mid-section;
a separator member centrally attached to said hollow shaft proximal to said mid-section;
said separator member having a first surface, a second surface located opposite said first surface, a peripheral region in contact with both said first and second surfaces and a central region, wherein said peripheral region forms a taper from said central region;
a webbed portion in said central region of said separator member configured to form at least one annular cavity around said at least one opening in said mid-section of said hollow shaft;
a first cover member centrally attached to said hollow shaft proximal to and separated from said first surface of said separator member;
a second cover member centrally attached to said hollow shaft proximal to and separated from said second surface of said separator member; and
a spindle that is connected to said hollow shaft.

2. An apparatus in accordance with claim 1, wherein said first end is configured to receive a first fluid.

3. An apparatus in accordance with claim 1, wherein said second end is configured to receive a second fluid.

4. An apparatus in accordance with claim 1, wherein said hollow shaft further comprises
a first chamber integral to said first end; and
a second chamber integral to said second end.

5. An apparatus in accordance with claim 4, wherein said first chamber extends to said at least one opening in said mid-section of said hollow shaft.

6. An apparatus in accordance with claim 4, wherein said second chamber extends to said at least one opening in said mid-section of said hollow shaft.

7. An apparatus in accordance with claim 1, wherein said at least one annular cavity is formed adjacent said first surface of said separator member.

8. An apparatus in accordance with claim 7, wherein said at least one annular cavity communicates with at least one opening adjacent said first surface.

9. An apparatus in accordance with claim 1, wherein said at least one annular cavity is formed adjacent said second surface of said separator member.

10. An apparatus in accordance with claim 9, wherein said at least one annular cavity communicates with at least one opening adjacent said second surface of said separator member.

11. An apparatus in accordance with claim 1, wherein said first cover comprises a first shroud having a wall contour replicating taper of said first surface of said separator member.

12. An apparatus in accordance with claim 1, wherein said second cover comprises a second shroud having a wall contour replicating taper of said second surface of said separator member.

13. An apparatus in accordance with claim 1, wherein said shroud has a stiffener rim to obviate intervening support structures.

14. An apparatus in accordance with claim 1, wherein said central region of said separator member has a thicker bodied taper where said webbed portion is formed.

15. A method comprising
providing a bichromal element spinner having a hollow shaft with opposite ends and openings at its mid-section, a tapered double-faced spinner disk centrally attached to said mid-section of said hollow shaft in communication with said openings through one or more annular cavities formed around a centrally formed webbed section on said disk, and one or more shrouds disposed proximal to and separated from said double faces of said spinner disk;
rotating said hollow shaft;
introducing first and second, differently colored, hardenable fluid materials through said opposite ends of said hollow shaft;
extruding said fluid materials through said openings in said hollow shaft;
pooling said fluid materials in said cavities against outside wall of said hollow shaft;

flowing said fluid materials from said cavities over said double faces of said tapered disk;

forming laminar flow of said fluids over surfaces of said double-faced spinner disk under cover by said shrouds;

propelling said first and second fluid materials from said spinning disk to form bichromal streams having side-by-side portions of different colors;

causing said forward end of each stream to be unstable and to break up into droplets which form into bichromal balls, each of said bichromal balls comprising portions of differently colored hardenable fluid; and collecting said bichromal balls.

16. A method in accordance with claim 15, wherein said rotating said hollow shaft includes rotating said bichromal element spinner.

17. A method in accordance with claim 15, wherein said rotating said hollow shaft includes rotating said shrouds.

18. A method in accordance with claim 15, wherein said extruding said fluid materials is accomplished by forcing said fluid materials under pressure from said openings into said annular cavities surrounding said hollow shaft.

19. A method in accordance with claim 15, wherein said flowing said fluid materials from said cavities over said double faces of said tapered disk is accomplished by causing said hollow shaft to rotate.

20. A method in accordance with claim 15, wherein said bichromal balls comprise spherical shapes.

* * * * *